US012808851B2

(12) United States Patent
Yamada et al.

(10) Patent No.: US 12,808,851 B2
(45) Date of Patent: Nov. 24, 2026

(54) CONTROL METHOD FOR AUTOMATIC ANALYZER

(71) Applicant: Hitachi High-Tech Corporation, Tokyo (JP)

(72) Inventors: Takumi Yamada, Tokyo (JP); Takayuki Sugime, Tokyo (JP); Naoto Sakamoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 636 days.

(21) Appl. No.: 18/273,111

(22) PCT Filed: Jan. 6, 2022

(86) PCT No.: PCT/JP2022/000207

§ 371 (c)(1),
(2) Date: Jul. 19, 2023

(87) PCT Pub. No.: WO2022/190605

PCT Pub. Date: Sep. 15, 2022

(65) Prior Publication Data

US 2024/0118251 A1 Apr. 11, 2024

(30) Foreign Application Priority Data

Mar. 8, 2021 (JP) ................................. 2021-036115

(51) Int. Cl.
*G01N 30/86* (2006.01)
*G01N 30/46* (2006.01)
(Continued)

(52) U.S. Cl.
CPC ............. *G01N 30/86* (2013.01); *G01N 30/46* (2013.01); *G01N 35/0092* (2013.01); *G01N 35/10* (2013.01)

(58) Field of Classification Search
CPC .... G01N 30/86; G01N 30/46; G01N 35/0092; G01N 35/10; G01N 30/88; G01N 30/20;
(Continued)

(56) References Cited

U.S. PATENT DOCUMENTS 4,468,331 A 8/1984 Antle et al.
11,821,879 B2 * 11/2023 Fujita .................... G01N 30/88
(Continued)

FOREIGN PATENT DOCUMENTS

CN 110694701 A 1/2020
JP 63-32367 A 2/1988
(Continued)

OTHER PUBLICATIONS

International Search Report (PCT/ISA/210) issued in PCT Application No. PCT/JP2022/000207 dated Mar. 15, 2022 with English translation (6 pages).
(Continued)

*Primary Examiner* — Jennifer Wecker
*Assistant Examiner* — Britney N. Washington
(74) *Attorney, Agent, or Firm* — Crowell & Moring LLP

(57) ABSTRACT

[Problem] To provide a control method of avoiding drop of a throughput by solvent substitution and of avoiding increase of a solvent consumption amount in a control method for an automatic analyzer including a liquid chromatograph that includes plural analysis flow passages arranged to be parallel to each other.
[Solution] Which one of plural analysis flow passages 105 to 107 is to be used is determined in introducing plural separation processes using solvents whose kind is different from each other with a time lag relative to one another, and a solvent used in a next separation process executed at timing after starting the plural separation processes determined to be introduced with a time lag relative to one another and
(Continued)

each of the solvents used in the plural separation processes determined to be introduced with a time lag relative to one another are compared. Whether or not a solvent substitution process is required for the analysis flow passages 105 to 107 used in the plural separation processes is determined, an analysis flow passage used in the next separation process out of the plural analysis flow passages 105 to 107 is determined according to the determination, and an analysis schedule is prepared.

8 Claims, 7 Drawing Sheets

(51) Int. Cl.
*G01N 35/00* (2006.01)
*G01N 35/10* (2006.01)

(58) Field of Classification Search
CPC ... G01N 2030/8813; G01N 2035/0094; G01N 30/26
See application file for complete search history.

(56) References Cited

U.S. PATENT DOCUMENTS

| | | | | |
|---|---|---|---|---|
| 2006/0207941 | A1 | 9/2006 | Morikawa | |
| 2013/0014566 | A1* | 1/2013 | Marks | G01N 30/24 73/61.55 |
| 2021/0223218 | A1* | 7/2021 | Maekawa | G01N 30/7233 |
| 2023/0417781 | A1* | 12/2023 | Katano | G01N 30/38 |

FOREIGN PATENT DOCUMENTS

| | | | |
|---|---|---|---|
| JP | 2006-258732 | A | 9/2006 |
| WO | WO 2014/068786 | A1 | 5/2014 |
| WO | WO 2017/216934 | A1 | 12/2017 |

OTHER PUBLICATIONS

Japanese-language Written Opinion (PCT/ISA/237) issued in PCT Application No. PCT/JP2022/000207 dated Mar. 15, 2022 (3 pages).

* cited by examiner

CONTROL METHOD FOR AUTOMATIC ANALYZER

TECHNICAL FIELD

The present invention relates to a control method for an automatic analyzer for performing quantitative or qualitative analysis of a biological sample such as blood or urine.

BACKGROUND ART

Some automatic analyzers use a chromatograph to separate the component as the object of analysis from the biological sample.

A chromatograph is an analyzer that makes a sample pass through a separation column filled with a stationary phase together with a mobile phase (solvent), to separate the component as the object of analysis through interaction between the component of the sample and the stationary phase and mobile phase. The separated component is detected by a detector so that the component of the sample can be identified. Particularly, a chromatograph that uses a liquid mobile phase is called a liquid chromatograph.

In the recent years, in order to make a quantitative measurement of a drug component or metabolite in a biological sample, the use of an automatic analyzer that uses a liquid chromatograph is increasing. In such an automatic analyzer that uses a liquid chromatograph, in many cases analysis is made successively, so there is the need for a high throughput.

However, in the conventional automatic analyzer that uses a liquid chromatograph, the time required for the separation process is long and there is a lot of time during which the detector does not get data, thereby posing a problem that throughput cannot be improved.

As a solution to the above problem, an automatic analyzer improves throughput by arranging plural analysis flow passages, each having a column, in parallel to each other and connecting them to one detector to improve the operation rate of the detector. In such an automatic analyzer in which plural analysis flow passages are arranged in parallel to each other, it is necessary to select the analysis flow passages to execute the separation process for each analysis in preparing an analysis schedule.

In a liquid chromatograph, one analysis flow passage at least includes a column to separate the component as the object of analysis and a liquid feed device to let a liquid flow into the column. If one automatic analyzer that uses a liquid chromatograph performs different types of separation processes, the solvents used for two separation processes to be executed successively in one analysis flow passage may be different in solvent composition. In that case, during the period between the two successive separation processes, the process to replace the solvent in the analysis flow passage (solvent substitution) must be performed to make the following separation process executable in the analysis flow passage.

If solvent substitution is performed, processing cycles to perform solvent substitution are inserted between the two successive separation processes. This pauses not only a problem that the throughput of the automatic analyzer drops, but also a problem that, due to replacement of the solvent in the analysis flow passage, the solvent consumption amount increases and the running cost increases.

As a solution to this problem, Patent Literature 1 proposes a technique that prepares an analysis schedule in which the order of analysis is changed so that plural samples are analyzed successively under the same separation conditions.

This technique shortens the time required for analysis by decreasing the number of times of cleaning the analysis flow passage (including solvent substitution).

CITATION LIST

Patent Literature

Patent Literature 1: WO2014/068786A1

SUMMARY OF INVENTION

Technical Problem

In the technique described in Patent Literature 1, in order to change the order of sample analysis, a space to store and evacuate the sample temporarily is required and if samples are controlled on a basis of racks, a mechanism to change the order on a rack-by-rack basis is required.

However, when the size and cost of the automatic analyzer are taken into consideration, it is not always possible to provide the abovementioned space and mechanism.

For this reason, in an automatic analyzer not provided with the abovementioned space and mechanism, the problem to be solved is to avoid a drop in throughput and an increase in the solvent consumption amount due to solvent substitution, without changing the order of analysis of the sample.

The object of the present invention is to solve the above problem and provide a control method and an automatic analyzer that avoid a drop in throughput and an increase in the solvent consumption amount due to solvent substitution, in the control method for an automatic analyzer having a chromatograph in which plural analysis flow passages are arranged in parallel to each other and the automatic analyzer.

Solution to Problem

In order to achieve the above object, the present invention is constituted as follows.

A control method is provided for an automatic analyzer that includes: a pretreatment unit executing pretreatment of a sample; a separation unit executing a separation process of separating the sample using plural kinds of solvent by a liquid chromatograph including plural analysis flow passages arranged to be parallel to each other, the sample being processed by the pretreatment unit; a detection unit detecting the sample separated by the separation unit; and a control unit. An analysis schedule is prepared in the control unit before execution of an analysis, and the sample is analyzed by the analyzer. The control method for the automatic analyzer comprises steps of: determining which one of the plural analysis flow passages is to be used in introducing plural separation processes using solvents whose kind is different from each other with a time lag relative to one another; comparing a solvent used in a next separation process executed at timing after starting the plural separation processes determined to be introduced with a time lag relative to one another with each of the solvents used in the plural separation processes determined to be introduced with a time lag relative to one another; determining whether or not a solvent substitution process is required for the analysis flow passage used in the plural separation processes; and determining an analysis flow passage to be used in the next separation process out of the plural analysis flow passages according to the determination, to prepare the analysis schedule.

An automatic analyzer comprises: a pretreatment unit executing pretreatment of a sample; a separation unit executing a separation process of separating the sample using plural kinds of solvent by a liquid chromatograph including plural analysis flow passages arranged to be parallel to each other, the sample being processed by the pretreatment unit; a detection unit detecting the sample separated by the separation unit; and a control unit. In the automatic analyzer in which an analysis schedule is prepared in the control unit before execution of an analysis and the sample is analyzed based on the analysis schedule prepared, the control unit determines which one of the plural analysis flow passages is to be used in introducing plural separation processes using solvents whose kind is different from each other with a time lag relative to one another, compares a solvent used in a next separation process executed at timing after starting the plural separation processes determined to be introduced with a time lag relative to one another with each of the solvents used in the plural separation processes determined to be introduced with a time lag relative to one another, determines whether or not a solvent substitution process is required for the analysis flow passage used in the plural separation processes, determines an analysis flow passage used in the next separation process out of the plural analysis flow passages according to the determination whether or not the solvent substitution process is required, and prepares the analysis schedule.

Advantageous Effects of Invention

According to the present invention, it is possible to provide a control method and an automatic analyzer that avoid a drop in throughput and an increase in the solvent consumption amount due to solvent substitution, in the control method for an automatic analyzer having a chromatograph in which plural analysis flow passages are arranged in parallel to each other, and the automatic analyzer.

DESCRIPTION OF EMBODIMENTS

Figure 1:
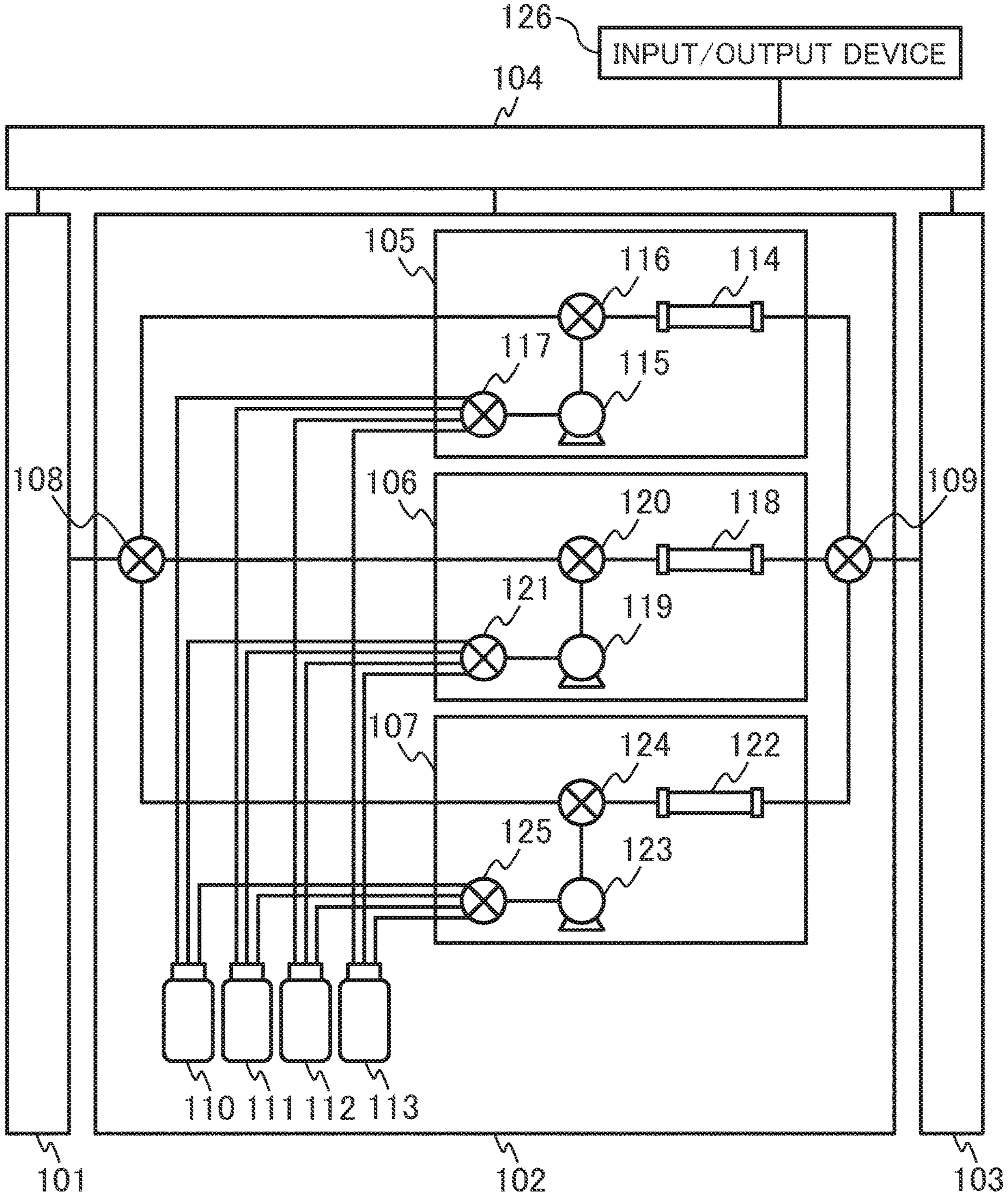
FIG. 1 is a schematic drawing showing a configuration of an automatic analyzer to which the present invention is applied.

Embodiments of the present invention will be described referring to drawings.

The present invention is not limited to the embodiments described below but can be applied within the scope of the technical idea.

In the embodiments of the present invention, a liquid chromatograph is used as a chromatograph, but even when another type of chromatograph, for example, a gas chromatograph is used, the present invention can be applied.

The control method of an automatic analyzer and the automatic analyzer according to the present invention are a control method for an automatic analyzer and an automatic analyzer in which the automatic analyzer includes a pretreatment unit 101 for executing pretreatment of a sample; a separation unit 102 for executing a separation process of separating the sample treated by the pretreatment unit 101 using plural kinds of solvent by a chromatograph including plural analysis flow passages arranged in parallel to each other;

- a detection unit 103 for detecting the sample separated by the separation unit 102; and a control unit 104 for controlling the pretreatment unit 101, the separation unit 102, and the detection unit 103. An analysis schedule is prepared in the control unit 104 before execution of an analysis, and the sample is analyzed based on the analysis schedule prepared.

Which one of the plural analysis flow passages 105 to 107 is to be used in introducing plural separation processes using solvents whose kind is different from each other with a time lag relative to one another is determined; comparison is made between a solvent to be used in a next separation process executed at timing after starting the plural separation processes determined to be introduced with a time lag relative to one another with each of the solvents to be used in the plural separation processes determined to be introduced with a time lag relative to one another; and whether or not a solvent substitution process is required for the analysis flow passages 105 to 107 used in the plural separation processes is determined. Then, according to the determination whether or not a solvent substitution process is required, the analysis flow passage 105 to 107 to be used in the next separation process out of the plural analysis flow passages 105 to 107 is determined to prepare the analysis schedule.

EMBODIMENTS

First Embodiment

FIG. 1 is a schematic drawing showing the configuration of an automatic analyzer to which the present invention is applied.

As shown in FIG. 1, the automatic analyzer includes a pretreatment unit 101 for executing pretreatment of a sample; a separation unit 102 for separating the sample treated by the pretreatment unit 101 by a liquid chromatograph including plural analysis flow passages arranged in parallel to each other; a detection unit 103 for detecting the sample separated by the separation unit 102; and a control unit 104 for controlling the pretreatment unit 101, the separation unit 102, and the detection unit 103. An input/output device 126 is used to display information and enter a command from a user in the control unit 104.

The separation unit 102 includes: an analysis flow passage 105, analysis flow passage 106 and analysis flow passage 107 that are arranged in parallel to each other; a valve 108 for switching the analysis flow passage into which the sample treated by the pretreatment unit 101 is introduced; a valve 109 for switching the analysis flow passage to be connected to the detection unit 103; and tanks 110, 111, 112, and 113 that contain different solvents.

The analysis flow passage 105 includes an analytical column 114, a liquid feed device 115 for feeding a solvent to the analytical column 114 with high pressure, an injection valve 116 connected to the liquid feed device 115 to introduce the sample into the analytical column 114, and a valve 117 for changing the solvent to be introduced into the liquid feed device 115. The valve 117 is connected to the solvent tank 110, solvent tank 111, solvent tank 112, and solvent tank 113.

The analysis flow passage 106 and analysis flow passage 107 have the same structure as the analysis flow passage 105.

In other words, the analysis flow passage 106 includes an analytical column 118, a liquid feed device 119 for feeding a solvent to the analytical column 118 with high pressure, an injection valve 120 connected to the liquid feed device 119 to introduce the sample into the analytical column 118, and a valve 121 for changing the solvent to be introduced into the liquid feed device 119. The valve 121 is connected to the solvent tank 110, solvent tank 111, solvent tank 112, and solvent tank 113.

Also, the analysis flow passage 107 includes an analytical column 122, a liquid feed device 123 for feeding a solvent to the analytical column 122 with high pressure, an injection valve 124 connected to the liquid feed device 123 to introduce the sample into the analytical column 122, and a valve 125 for changing the solvent to be introduced into the liquid feed device 123. The valve 125 is connected to the solvent tank 110, solvent tank 111, solvent tank 112, and solvent tank 113.

After pretreating the sample, the pretreatment unit 101 introduces the sample into the separation unit 102. The separation unit 102 introduces the sample pretreated by the pretreatment unit 101 into one of the analysis flow passage 105, analysis flow passage 106 and analysis flow passage 107 through the valve 108 and executes a separation process. The sample for which the separation process has been executed is introduced into the detection unit 103 through the valve 109. The detection unit 103 detects the component as the object of analysis from the sample introduced from the separation unit 102.

FIG. 1 shows the valve 108 to introduce the sample treated by the pretreatment unit 101 into the analysis flow passage 105, analysis flow passage 106 or analysis flow passage 107 and the valve 109 to change the analysis flow passage 105, analysis flow passage 106 or analysis flow passage 107 to be connected to the detection unit 103.

The figure also shows one liquid feed device and one solvent change valve in each of the analysis flow passage 105, analysis flow passage 106 and analysis flow passage 107. However, the number of valves and liquid feed devices is not limited to one. As for the valve 108, instead of a valve, a nozzle may be provided for each analysis flow passage so that the sample can be introduced into each analysis flow passage.

Figure 2:
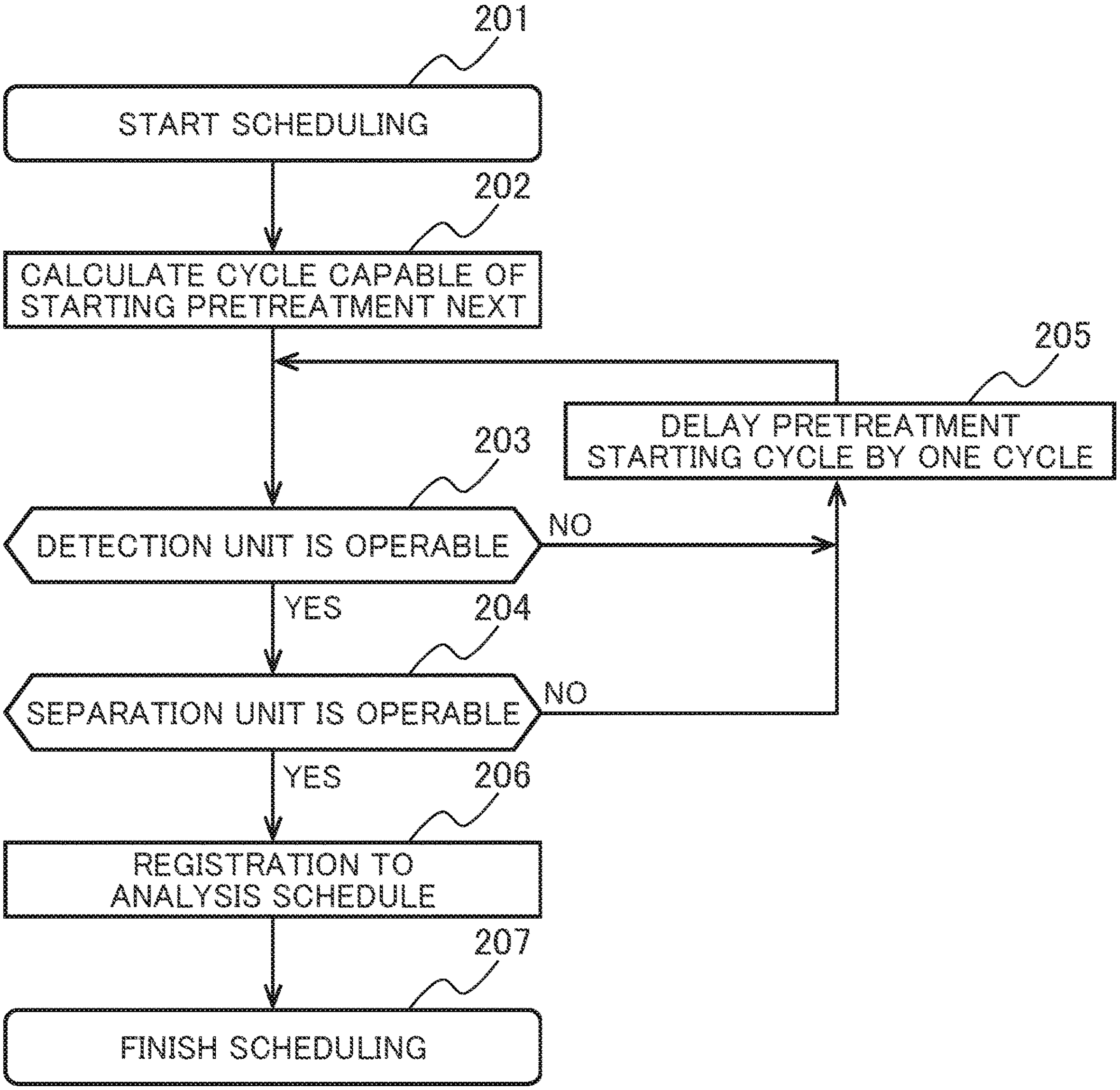
FIG. 2 is a flowchart showing a process procedure of scheduling of an overall automatic analyzer in the present embodiment.

FIG. 2 is a flowchart showing the process procedure of analysis scheduling of the overall automatic analyzer. The process of each of the steps shown in the flowchart of FIG. 2 is summarized as follows.

At Step 201, the control unit 104 starts scheduling for analysis.

At Step 202, the control unit 104 calculates a vacant cycle in which pretreatment for the above analysis can be started, in the present analysis schedule.

At Step 203, the control unit 104 determines whether or not the detection unit 103 is capable of detecting the sample when analysis is started in the cycle calculated at Step 202. While the separation unit 102 for a sample has plural analysis flow passages, namely the analysis flow passage 105, analysis flow passage 106 and analysis flow passage 107, the detection unit 103 has only one detector. Therefore, it is necessary to perform scheduling so that the timing of introduction of the sample from the analysis flow passages 105 to 107 into the detector does not overlap. At Step 203, if it is determined that the detection unit 103 cannot detect a sample, the procedure goes to Step 205. At Step 203, if it is determined that the detection unit 103 can detect a sample, the procedure goes to Step 204.

At Step 204, the control unit 104 determines whether or not the separation unit 102 is capable of executing the sample separation process when the above analysis is started in the cycle calculated at Step 202. At Step 204, if it is determined that the separation unit 102 cannot execute the sample separation process, the procedure goes to Step 205. At Step 204, if it is determined that the separation unit 102 can execute the sample separation process, the procedure goes to Step 206.

If inoperability is determined at Step 203 or Step 204, at Step 205 the control unit 104 delays the analysis start cycle by one cycle. Then, the procedure goes back to Step 203.

When the above analysis is started in the cycle calculated at Step 202 and both the separation unit 102 and the detection unit 103 are operable for the sample, at Step 206 the control unit 104 registers the above analysis to the cycle.

At Step 207, the control unit 104 finishes scheduling for the above analysis.

Figure 3:
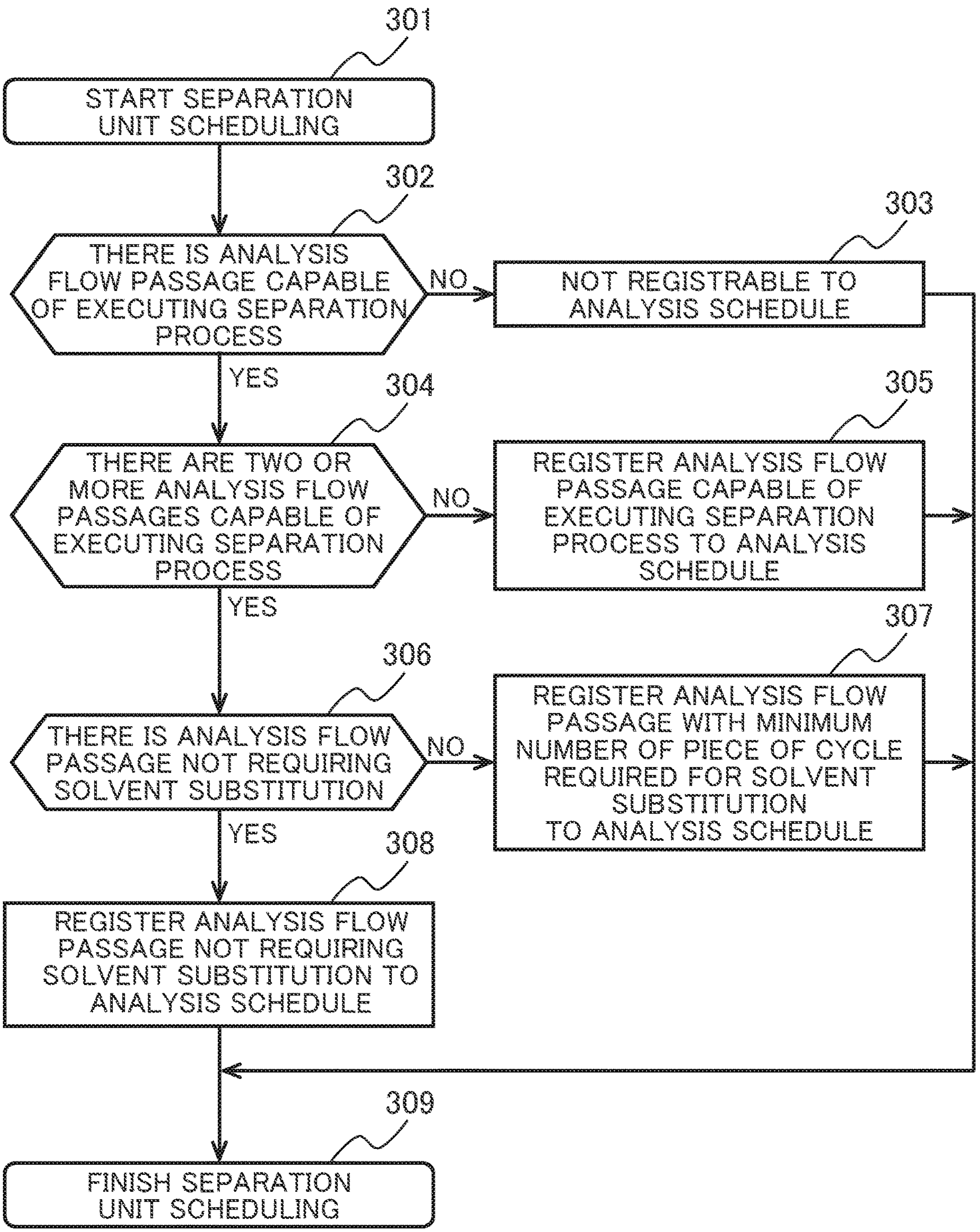
FIG. 3 is a flowchart showing in more detail the process procedure of scheduling in a separation unit out of FIG. 2.

FIG. 3 is a flowchart showing the process procedure of scheduling of the separation unit 102 for the sample, which corresponds to Step 204 in the flowchart of FIG. 2. The process at each step is summarized as follows.

At Step 301, the control unit 104 starts scheduling of the sample separation unit 102 for the sample separation process.

At Step 302, the control unit 104 determines whether or not out of the analysis flow passages 105 to 107 there is an analysis flow passage capable of executing the sample separation process. If there is no such analysis flow passage, the procedure goes to Step 303. If there is such analysis flow passage, the procedure goes to Step 304.

At Step 303, if out of the analysis flow passages 105 to 107 there is no analysis flow passage capable of executing the sample separation process, the control unit 104 determines that the sample separation process cannot be registered to an analysis schedule. Then, the procedure goes to Step 309.

At Step 304, the control unit 104 determines whether or not out of the analysis flow passages 105 to 107 there are two or more analysis flow passages capable of executing the sample separation process. If there are not two or more such analysis flow passages, the procedure goes to Step 305. If there are two or more such analysis flow passages, the procedure goes to Step 306.

If there is only one analysis flow passage capable of executing the sample separation process, at Step 305 the control unit 104 registers the sample separation process to the analysis schedule for that analysis flow passage. Then, the procedure goes to Step 309.

If there are two or more analysis flow passages capable of executing the sample separation process, at Step 306 the control unit 104 determines whether or not there is an analysis flow passage not requiring solvent substitution. If there is no analysis flow passage not requiring solvent substitution, the procedure goes to Step 307. If there is an analysis flow passage not requiring solvent substitution, the procedure goes to Step 308.

If there is no analysis flow passage not requiring solvent substitution, at Step 307 the control unit 104 registers the sample separation process to the analysis schedule for the analysis flow passage in which the processing cycle to be added for solvent substitution is the minimum (shortest). Then, the procedure goes to Step 309.

If there is an analysis flow passage not requiring solvent substitution, at Step 308 the control unit 104 registers the sample separation process to the analysis schedule for that analysis flow passage. Then, the procedure goes to Step 309.

At Step 309, the control unit 104 finishes scheduling of the separation unit 102 for the sample separation process.

Figure 4A:
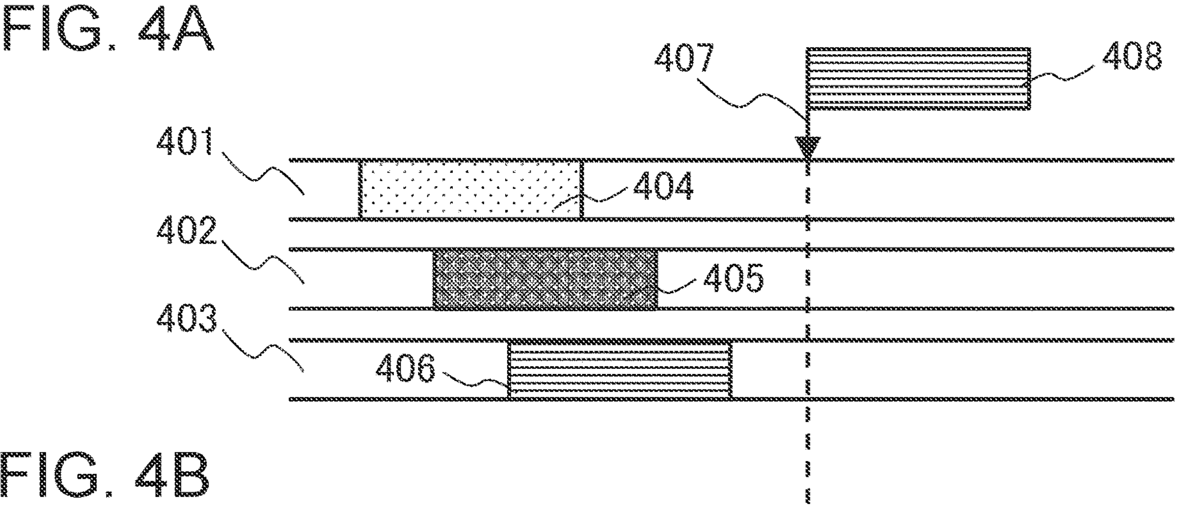
FIGS. 4A to 4D are schematic drawings of scheduling in the first embodiment.

FIGS. 4A to 4D are diagrams showing an example of scheduling of the separation unit 102. FIG. 4A is a diagram that roughly shows the analysis schedule conditions of the analysis flow passages 105, 106 and 107 at the start of scheduling.

FIG. 4A shows that in the control unit 104, a separation process 404 using solvent A is registered to an analysis schedule 401 for the analysis flow passage 105, a separation process 405 using solvent B is registered to an analysis schedule 402 for the analysis flow passage 106, and a separation process 406 using solvent C is registered to an analysis schedule 403 for the analysis flow passage 107. In this condition, at timing 407 when the separation process 404, separation process 405 and separation process 406 have been finished, scheduling for a separation process 408 as the next separation process using solvent C is performed. The process procedure in this case is explained below according to the steps of the flowchart of FIG. 3.

At Step 301, the control unit 104 starts scheduling of the separation unit 102 for the separation process 408. Then, the procedure goes to Step 302.

At Step 302, since the three analysis flow passages, namely the analysis flow passage 105, analysis flow passage 106 and analysis flow passage 107, are capable of executing the separation process, the control unit 104 determines that there is an analysis flow passage capable of executing the separation process and goes to Step 304.

At Step 304, since the three analysis flow passages, namely the analysis flow passage 105, analysis flow passage 106 and analysis flow passage 107, are capable of executing the separation process, the control unit 104 determines that there are plural analysis flow passages capable of executing the separation process and goes to Step 306.

Figure 4B:
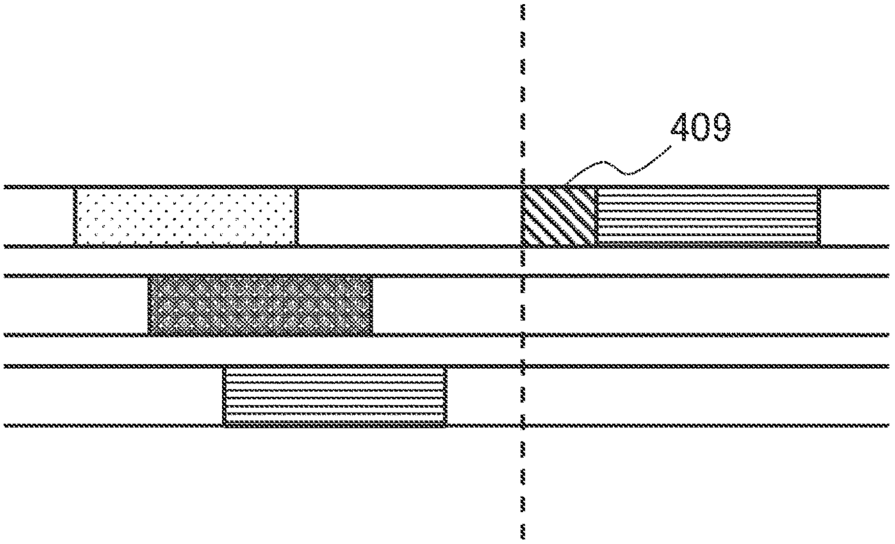
Figure 4C:
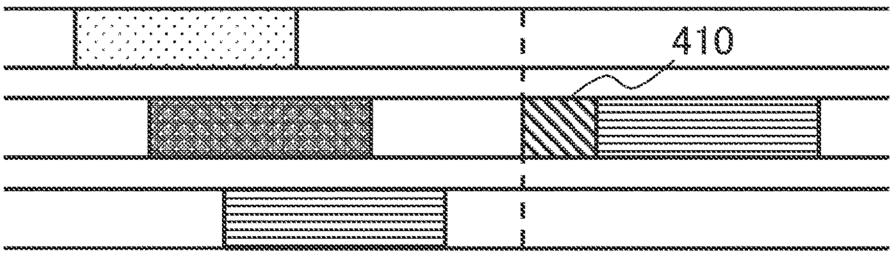

At Step 306, if the separation process 408 is registered to the analysis schedule 401, the solvent used in the separation process 404 executed last in the analysis flow passage 105 is different from the solvent to be used in the separation process 408, so a solvent substitution process 409 must be inserted before the separation process 408 as shown in FIG. 4B. If the separation process 408 is registered to the analysis schedule 402, the solvent used in the separation process 405 executed last in the analysis flow passage 106 is different from the solvent to be used in the separation process 408, so a solvent substitution process 410 must be inserted before the separation process 408 as shown in FIG. 4C.

Figure 4D:
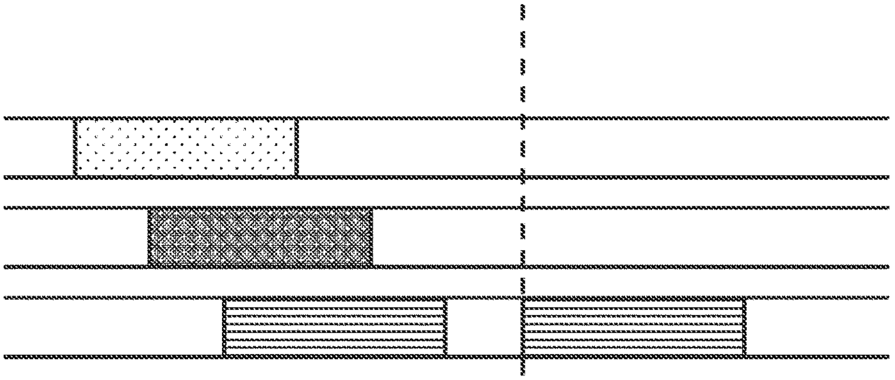

On the other hand, if the separation process 408 is registered to the analysis schedule 403, the solvent used in the separation process 406 executed last in the analysis flow passage 107 is the same as the solvent to be used in the separation process 408, so a solvent substitution process need not be executed as shown in FIG. 4D. Therefore, the control unit 104 determines that there is an analysis flow passage not requiring solvent substitution and goes to Step 308.

At Step 308, the control unit 104 registers the separation process 408 to the analysis schedule 403 for the analysis flow passage 107 not requiring solvent substitution. Then the procedure goes to Step 309.

At Step 309, the control unit 104 finishes scheduling of the separation unit 102 for the separation process 408.

As explained above, the solvent C to be used in the next separation process 408 to be executed after the timing 407 is compared with the solvents A, B and C used in the separation processes 404, 405 and 406 which were, executed before the timing 407, and the analysis flow passage 107 in which the separation process 406 has been executed using solvent C is selected to execute the separation process 408 after the timing 407. Consequently, since a solvent substitution process is not required, a solvent substitution process can be avoided and a drop in throughput and the solvent consumption amount can be suppressed.

In short, in the control method for an automatic analyzer having a liquid chromatograph in which plural analysis flow passages are arranged in parallel to each other and the automatic analyzer, it is possible to provide a control method and an automatic analyzer that avoid a drop in throughput and an increase in the solvent consumption amount due to solvent substitution.

Second Embodiment

Next, the second embodiment will be described.

The second embodiment concerns an example of scheduling of the separation unit 102 that is different from the example in the first embodiment, in the same analyzer configuration as in the first embodiment.

The configuration of the automatic analyzer in the second embodiment is the same as that in the first embodiment shown in FIG. 1, so diagrammatic representation and detailed description are omitted. Also, the first embodiment and second embodiment are the same in the outline of the overall scheduling procedure of the automatic analyzer (FIG. 2) and the outline of the scheduling procedure of the separation unit 102 (FIG. 3), so diagrammatic representation is omitted.

Figure 5A:
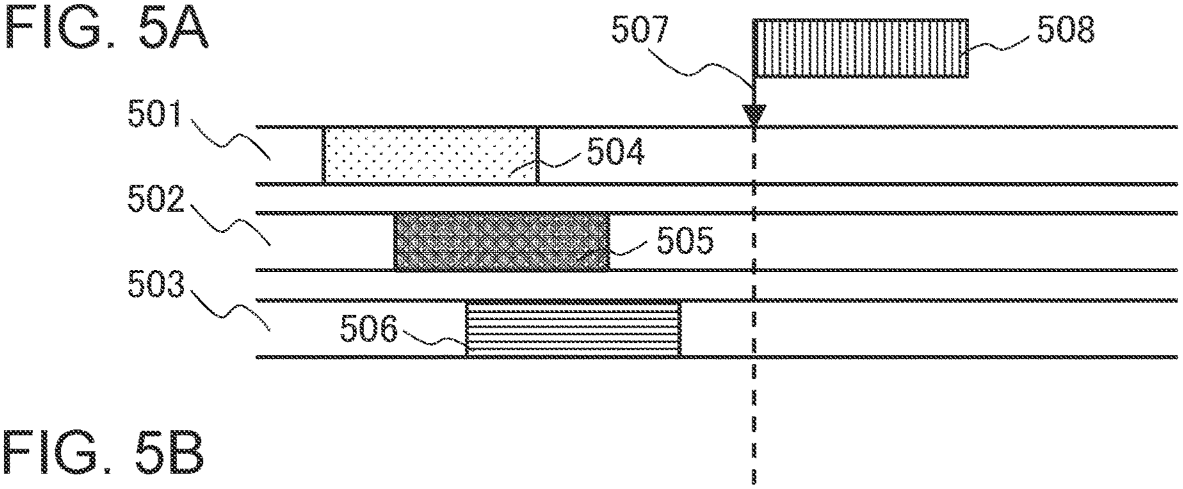
FIGS. 5A to 5D are schematic drawings of scheduling in the second embodiment.

FIGS. 5A to 5D are diagrams showing an example of scheduling of the separation unit 102. FIG. 5A is a diagram that roughly shows the analysis schedule conditions of the analysis flow passages 105, 106 and 107 at the start of scheduling.

FIG. 5A shows that in the control unit 104, a separation process 504 using solvent A is registered to an analysis schedule 501 for the analysis flow passage 105, a separation process 505 using solvent B is registered to an analysis schedule 502 for the analysis flow passage 106, and a separation process 506 using solvent C is registered to an analysis schedule 503 for the analysis flow passage 107. In this condition, at timing 507 when the separation process 504, separation process 505 and separation process 506 have been finished, scheduling of a separation process 508 as the next separation process using solvent D is performed.

Here, the cycles required to perform solvent substitution from the solvent A, solvent B and solvent C to the solvent D in the analysis flow passage 105, the analysis flow passage 106, and the analysis flow passage 107 respectively are defined as two cycles for the solvent A, two cycles for the solvent B and one cycle for the solvent C because of the natures of the solvents. The process procedure in this case is explained below according to the steps of the flowchart of FIG. 3.

At Step 301, the control unit 104 starts scheduling for the separation process 508. Then, the procedure goes to Step 302.

At Step 302, since the three analysis flow passages, namely the analysis flow passage 105, analysis flow passage 106 and analysis flow passage 107, are capable of executing the separation process, the control unit 104 determines that there is an analysis flow passage capable of executing the separation process and goes to Step 304.

At Step 304, since the three analysis flow passages, namely the analysis flow passage 105, analysis flow passage 106 and analysis flow passage 107, are capable of executing the separation process, the control unit 104 determines that there are plural analysis flow passages capable of executing the separation process and goes to Step 306.

At Step 306, the control unit 104 determines that solvent substitution is required for any of the analysis flow passage 105, analysis flow passage 106 and analysis flow passage 107 and goes to Step 307.

Figure 5B:
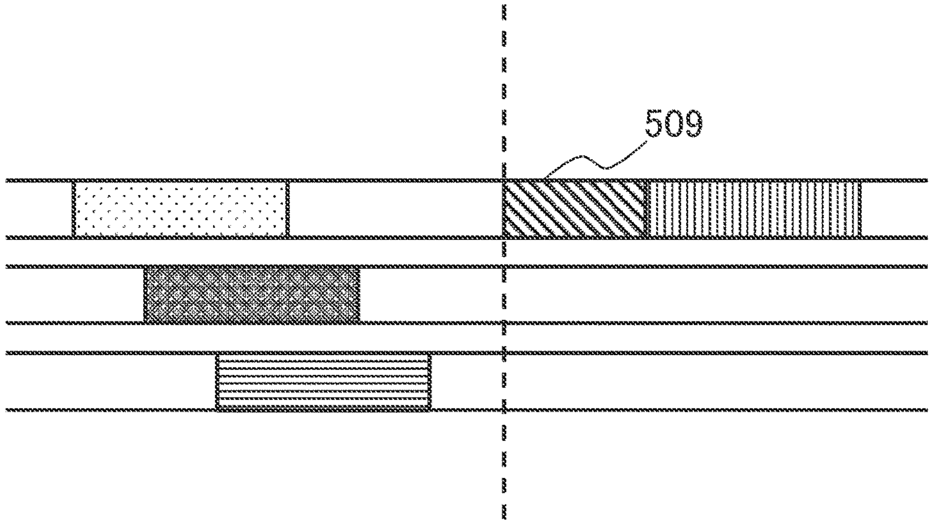
Figure 5C:
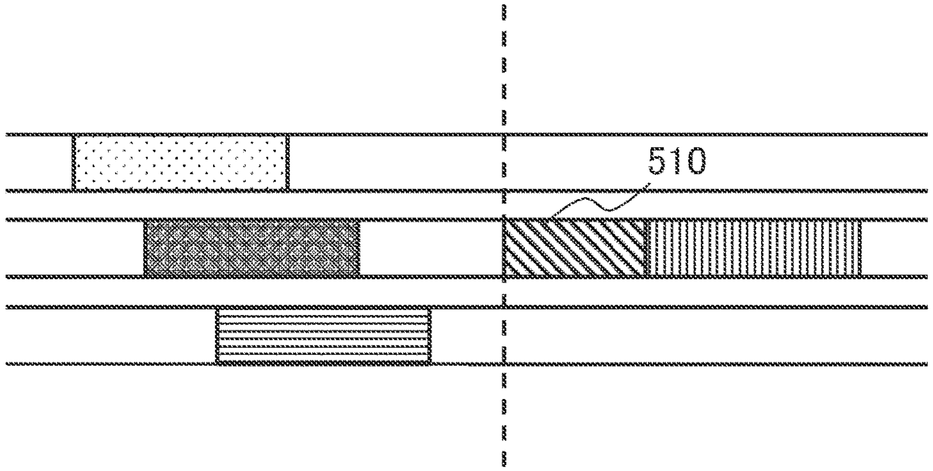

At Step 307, if the separation process 508 that uses the solvent D is registered to the analysis schedule 501, two cycles are added as processing cycles for solvent substitution, so a solvent substitution process 509 is added as shown in FIG. 5B. Similarly, if the separation process 508 is registered to the analysis schedule 502, two cycles are added as processing cycles for solvent substitution, so a solvent substitution process 510 is added as shown in FIG. 5C.

Figure 5D:
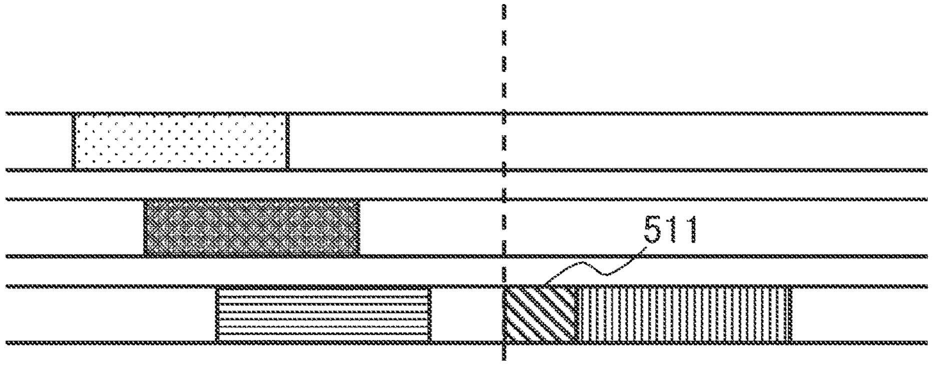

On the other hand, if the separation process 508 is registered to the analysis schedule 503, one cycle is added as a processing cycle for solvent substitution, so a solvent substitution process 511 is added as shown in FIG. 5D.

Therefore, the control unit 104 determines to register the separation process 508 to the analysis schedule 503 for the analysis flow passage 107 in which the number of processing cycles to be added for solvent substitution is the smallest and registers it together with the solvent substitution process 511. Then, the procedure goes to Step 309.

At Step 309, the control unit 104 finishes scheduling of the separation unit 102 for the separation process 508.

As explained above, the solvent D to be used in the separation process 508 to be executed after timing 507 is compared with the solvents A, B and C used in the separation processes 504, 505 and 506 executed before timing 507, and the analysis flow passage 107 in which the separation process 506 requiring the smallest number of cycles for solvent substitution to the solvent D has been executed is selected to execute the separation process 508 after timing 507. Consequently, since the time required for solvent substitution can be minimized, the drop in throughput and the solvent consumption amount can be suppressed.

As in the first embodiment, also in the second embodiment, it is possible to provide a control method and an automatic analyzer that avoid a drop in throughput and an increase in the solvent consumption amount due to solvent substitution, in the control method for an automatic analyzer having a liquid chromatograph in which plural analysis flow passages are arranged in parallel to each other and the automatic analyzer.

Third Embodiment

Next, the third embodiment will be described. The third embodiment concerns an example of scheduling of the separation unit 102 that is different from the examples in the first embodiment and second embodiment, in the same analyzer configuration as in the first embodiment.

The configuration of the automatic analyzer in the third embodiment is the same as that in the first embodiment shown in FIG. 1, so diagrammatic representation and detailed description are omitted. Also, the outline of the overall scheduling procedure of the automatic analyzer (FIG. 2) is the same as in the first embodiment, so diagrammatic representation is omitted.

In performing scheduling, depending on the nature of the analysis to be registered and the analysis schedule condition of each analysis flow passage, if registration is made to an analysis flow passage not requiring solvent substitution, the analysis concerned may be finished later than when registration is made to another analysis flow passage, namely throughput may be lowered.

Therefore, in the third embodiment, the user can select a first scheduling method or a second scheduling method, in which the first scheduling method prioritizes a process not requiring solvent substitution or a process in which the additional processing cycle due to solvent substitution is the shortest, and the second scheduling method prioritizes throughput over a process in which the additional processing cycle due to solvent substitution is the shortest. In other words, for an analysis schedule, the first scheduling method and second scheduling method are available. The user can select either the first scheduling method or the second scheduling method using the input/output device 126 and give the selection command to the control unit 104.

Figure 6:
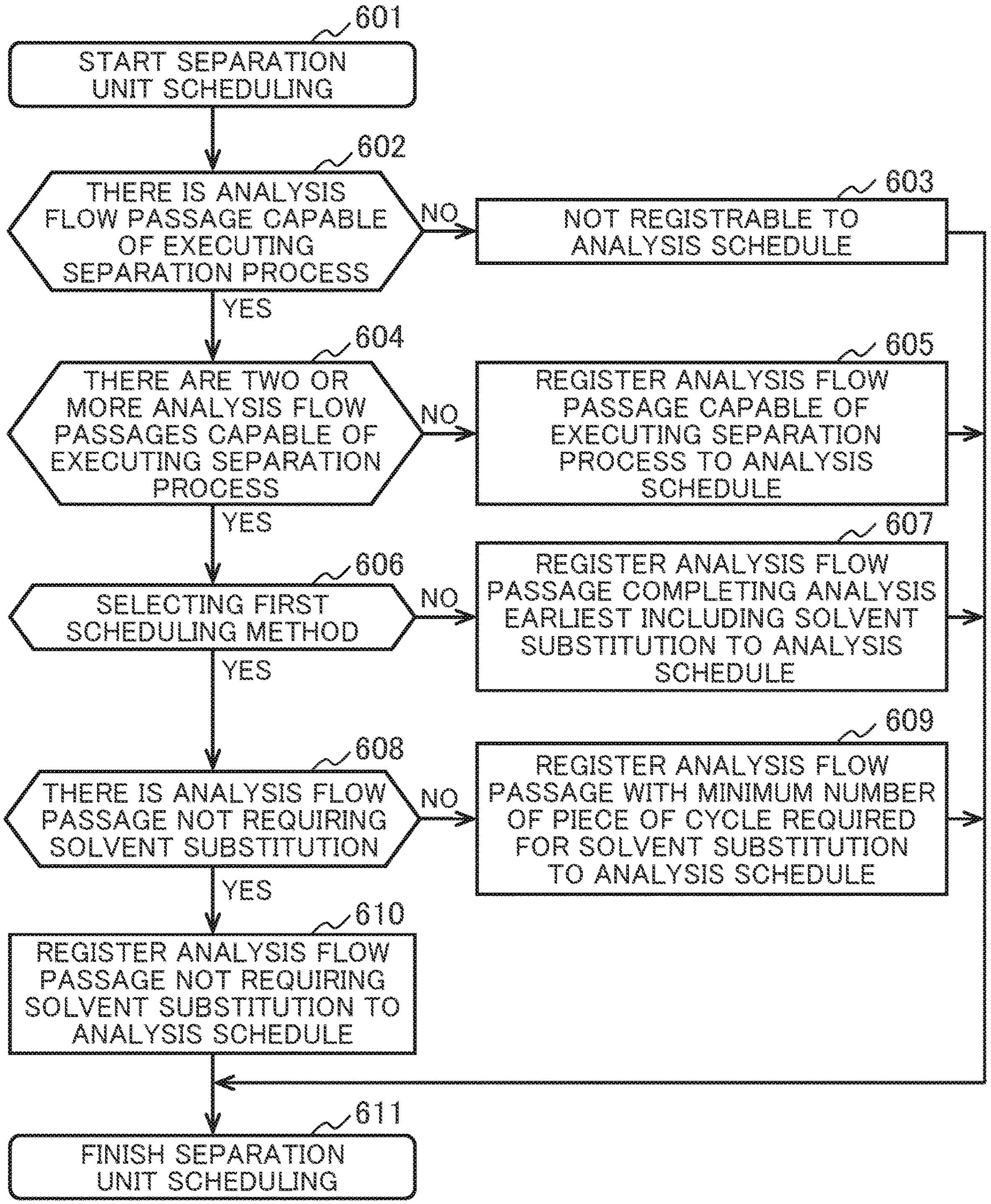
FIG. 6 is a flowchart showing in more detail a process procedure of scheduling in a separation unit out of FIG. 2 of a case in which the scheduling method in the third embodiment can be selected from two methods.

FIG. 6 is a flowchart showing a case that the scheduling method can be selected between the first scheduling method and the second scheduling method. The flowchart shown in FIG. 6, which corresponds to Step 204 in the flowchart shown in FIG. 2, is a flowchart showing the scheduling procedure for the separation unit 102.

Figure 7A:
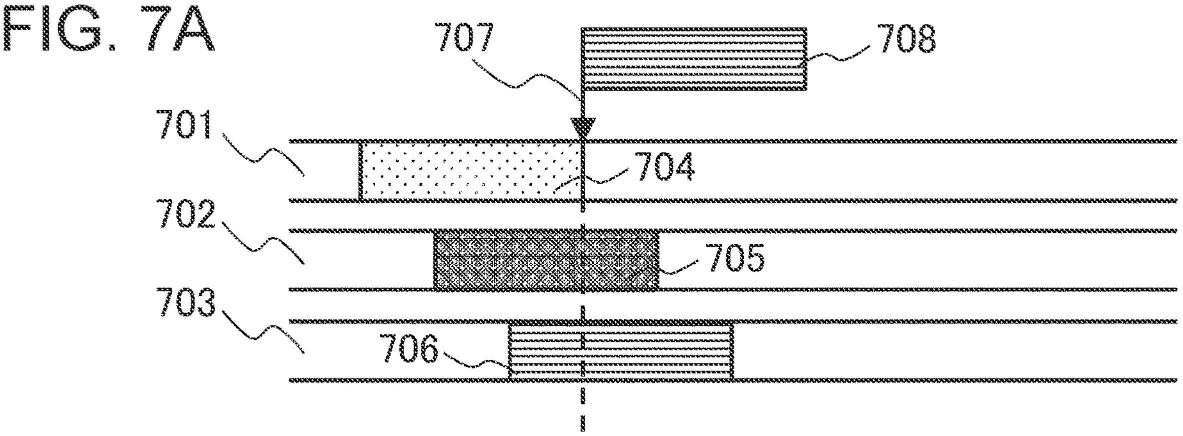
FIGS. 7A to 7D are schematic drawings of scheduling in the third embodiment.

FIGS. 7A to 7D show an example of scheduling of the separation unit 102. FIG. 7A is a diagram that roughly shows the analysis schedule conditions of the analysis flow passages 105, 106 and 107 at the start of scheduling. In the control unit 104, a separation process 704 using solvent A is registered to an analysis schedule 701 for the analysis flow passage 105, a separation process 705 using solvent B is registered to an analysis schedule 702 for the analysis flow passage 106, and a separation process 706 using solvent C is registered to an analysis schedule 703 for the analysis flow passage 107. In this condition, at timing 707 when the separation process 704 has been finished and the separation process 705 and separation process 706 are under way, scheduling of a separation process 708 as the next separation process using solvent C is performed.

Here, the processing cycles required to perform solvent substitution from the solvent A and solvent B to the solvent C in the analysis flow passage 105 and the analysis flow passage 106 respectively is defined as one cycle because of the natures of the solvents.

The processing procedure in the case that the first scheduling method is selected is explained below according to the steps of the flowchart of FIG. 6.

At Step 601, the control unit 104 starts scheduling of the separation unit for the separation process 708. The procedure goes to Step 602.

At Step 602, the control unit 104 determines whether or not out of the three analysis flow passages, namely the analysis flow passage 105, analysis flow passage 106 and analysis flow passage 107, there is an analysis flow passage capable of executing the separation process. If there is no analysis flow passage capable of executing the separation process, the procedure goes to Step 603. If there is an analysis flow passage capable of executing the separation process, the procedure goes to Step 604. In the example shown in FIGS. 7A to 7D, the three analysis flow passages, namely the analysis flow passage 105, analysis flow passage 106 and analysis flow passage 107, are capable of executing the separation process, so the procedure goes to Step 604.

If out of the analysis flow passages 105 to 107 there is no analysis flow passage capable of executing the sample separation process, at Step 603 the control unit 104 determines that the sample separation process cannot be registered to an analysis schedule. Then, the procedure goes to Step 611.

At Step 604, the control unit 104 determines whether or not out of the three analysis flow passages, namely the analysis flow passage 105, analysis flow passage 106 and analysis flow passage 107, there are two or more analysis flow passages capable of executing the separation process. If it determines that there are not two or more analysis flow passages capable of executing the separation process, the procedure goes to Step 605. If it determines that there are two or more analysis flow passages capable of executing the separation process, the procedure goes to Step 606. In the example shown in FIGS. 7A to 7D, there are two or more analysis flow passages capable of executing the separation process, so the procedure goes to Step 606.

If there is only one analysis flow passage capable of executing the sample separation process, at Step 605 the control unit 104 registers the sample separation process to the analysis schedule for that analysis flow passage. Then, the procedure goes to Step 611.

At Step 606, the control unit 104 determines whether or not the first scheduling method is selected. If the first scheduling method is not selected, the procedure goes to Step 607. If it determines that the first scheduling method is selected, the procedure goes to Step 608.

In the example shown in FIGS. 7A to 7D, the first scheduling method is selected, so the procedure goes to Step 608.

At Step 607, the control unit 104 registers to the separation schedule for the analysis flow passage to finish the analysis including solvent substitution the earliest. Then, the procedure goes to Step 611.

At Step 608, the control unit 104 determines whether or not there is an analysis flow passage not requiring solvent substitution. If it determines that there is no analysis flow passage not requiring solvent substitution, the procedure goes to Step 609. If it determines that there is an analysis flow passage not requiring solvent substitution, the procedure goes to Step 610.

Figure 7B:
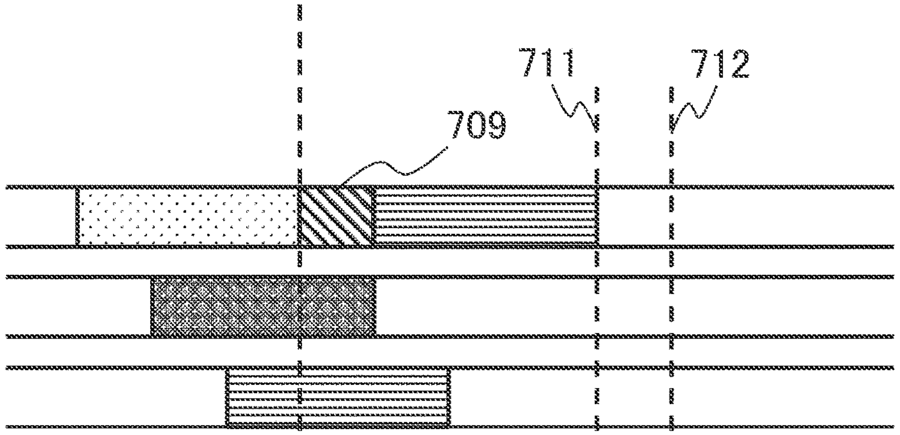

In the example shown in FIGS. 7A to 7D, if the separation process 708 is registered to the analysis schedule 701, the solvent used for the separation process 704 executed last in the analysis flow passage 105 is different from the solvent to be used in the separation process 708, so a solvent substitution process 709 must be inserted before the separation process 708 as shown in FIG. 7B.

Figure 7C:
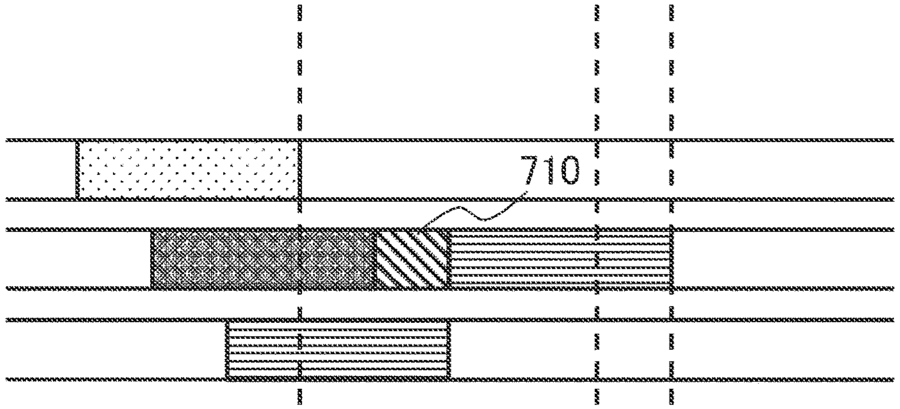

Also, if the separation process 708 is registered to the analysis schedule 702, the solvent used for the separation process 705 executed last in the analysis flow passage 106 is different from the solvent to be used in the separation process 708, so a solvent substitution process 710 must be inserted before the separation process 708 as shown in FIG. 7C.

Figure 7D:
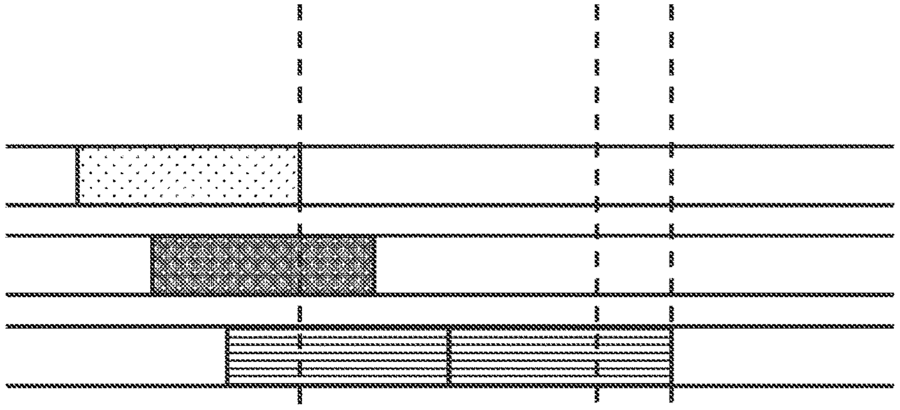

On the other hand, if the separation process 708 is registered to the analysis schedule 703, the solvent used for the separation process 706 executed last in the analysis flow passage 107 is the same as the solvent to be used in the separation process 708, so a solvent substitution process need not be executed as shown in FIG. 7D. Therefore, the control unit 104 determines that there is an analysis flow passage not requiring solvent substitution and goes to Step 610.

If there is no analysis flow passage not requiring solvent substitution, at Step 609 the control unit 104 registers the sample separation process to the analysis schedule for the analysis flow passage in which the processing cycle to be added for solvent substitution is the minimum (shortest). Then, the procedure goes to Step 611.

At Step 610, the control unit 104 registers the separation process 708 to the analysis schedule 703 for the analysis flow passage 107 not requiring solvent substitution. Then, the procedure goes to Step 611.

At Step 611, the control unit 104 finishes scheduling of the separation unit 102 for the separation process 708.

On the other hand, the scheduling procedure in the case that the second scheduling method is selected is explained below according to the steps of the flowchart of FIG. 6. Since the steps up to Step 604 are the same as when the first scheduling method is selected, description of these steps is omitted and assuming that the second scheduling method is selected at Step 606, Step 606 and the subsequent steps are explained below.

Since not the first scheduling method but the second scheduling method is selected at Step 606, the procedure goes to Step 607.

At Step 607, if the separation process 708 is registered to the analysis schedule 701, the solvent used for the separation process 704 executed last in the analysis flow passage 105 is different from the solvent to be used in the separation process 708, so the solvent substitution process 709 must be inserted before the separation process 708 as shown in FIG. 7B. Therefore, the separation process 708 is expected to be finished at timing 711.

If the separation process 708 is registered to the analysis schedule 702, the solvent used for the separation process 705 executed last in the analysis flow passage 106 is different from the solvent to be used in the separation process 708, so the solvent substitution process 710 must be inserted before the separation process 708 as shown in FIG. 7C and thus the separation process 708 is expected to be finished at timing 712 which is after timing 711.

On the other hand, if the separation process 708 is registered to the analysis schedule 703, the solvent used for the separation process 706 executed last in the analysis flow passage 107 is the same as the solvent to be used in the separation process 708, so a solvent substitution process need not be executed as shown in FIG. 7D, so the separation process 708 is expected to be finished at timing 712.

Timing 712 is later than timing 711. Therefore, the control unit 104 determines to register the separation process 708 to the analysis schedule 701 for the analysis flow passage 105 in which the separation process 708 is expected to be finished the earliest and registers it together with the solvent substitution process 709. Then, the procedure goes to Step 611.

At Step 611, the control unit 104 finishes scheduling of the separation unit for the separation process 708.

As explained above, by selecting the first scheduling method, the additional process for solvent substitution is the shortest and thus the solvent consumption amount can be suppressed. On the other hand, by selecting the second scheduling method, the analysis concerned can be finished earlier and thus the throughput of the automatic analyzer can be improved.

As explained above, since the user can select either the first scheduling method or the second scheduling method, the scheduling method suitable for the way of operation by the user can be provided.

As explained above, for an analysis schedule, the third embodiment provides: the first scheduling method in which as the analysis flow passage to be used for the next separation process 708, the analysis flow passage determined as not requiring solvent substitution is selected out of the plural analysis flow passages 105 to 107: and the second scheduling method in which as the analysis flow passage to be used for the next separation process 708 out of the plural analysis flow passages 105 to 107, the analysis flow passage 105 determined to finish the separation process the earliest, among the separation process finishing timing 712 for the analysis flow passage 107 determined as not requiring solvent substitution and the separation process finishing timings 711 and 712 for the analysis flow passages 105 and 106 determined as requiring solvent substitution, is selected.

The automatic analyzer includes an input/output device 126 and either the first scheduling method or the second scheduling method is selected using the input/output device 126.

Also in the third embodiment, as in the first and second embodiments, it is possible to provide a control method and automatic analyzer that avoid a drop in throughput and an increase in the solvent consumption amount due to solvent substitution, in the control method for the automatic analyzer having a chromatograph in which plural analysis flow passages are arranged in parallel to each other, and the automatic analyzer.

LIST OF REFERENCE SIGNS

101: pretreatment unit
102: separation unit
103: detection unit
104: control unit
105, 106, 107: analysis flow passage
108, 109, 116, 117, 120, 121, 124, 125: valve
110, 111, 112, 113: solvent tank
114, 118, 122: analytical column
115, 119, 123: liquid feed device
126: input/output device
401, 402, 403, 501, 502, 503, 701, 702, 703: analysis schedule of analysis flow passage
404, 405, 406, 408, 504, 505, 506, 508, 704, 705, 706, 708: separation process
407, 507, 707, 711, 712: scheduling timing
409, 410, 509, 510, 511, 709, 710: solvent substitution process

The invention claimed is:

1. A control method for an automatic analyzer, the automatic analyzer including:
a pretreatment unit configured to pretreat of a sample;
a separation unit configured to separate the sample using a plurality of solvents and a liquid chromatograph comprising a plurality of analysis flow passages arranged to be parallel to each other, wherein the sample is processed by the pretreatment unit and the plurality of solvents are different from each other;
a detection unit configured to detect the sample separated by the separation unit; and
a control unit configured to control the pretreatment unit, the separation unit, and the detection unit, wherein the control unit is further configured to prepare an analysis schedule before execution of an analysis, and wherein the sample is analyzed based on the analysis schedule prepared,
the control method for an automatic analyzer comprising steps of:
determining which one of the plurality of analysis flow passages is to be used in introducing a plurality of separation processes using the plurality of solvents with a time lag relative to one another;
comparing a solvent used in a next separation process executed at timing after starting the plurality of separation processes determined to be introduced with a time lag relative to one another with each of the solvents used in the plurality of separation processes determined to be introduced with a time lag relative to one another;
determining whether or not a solvent substitution process is required for the analysis flow passage used in the plurality of separation processes; and
determining an analysis flow passage used in the next separation process out of the plurality of analysis flow passages according to the determination whether or not the solvent substitution process is required, to prepare the analysis schedule.

2. The control method for an automatic analyzer according to claim 1, wherein an analysis flow passage used in the next separation process out of the plurality of analysis flow passages is configured to be an analysis flow passage where the solvent substitution process is determined not to be required.

3. The control method for an automatic analyzer according to claim 1, further comprising steps of: determining whether or not a solvent substitution process is required for the analysis flow passage used in the plurality of separation processes; and
when the solvent substitution process is determined to be required for all of the plurality of analysis flow passages, determining an analysis flow passage where a cycle required for the solvent substitution process is minimum out of the plurality of analysis flow passages as an analysis flow passage used in the next separation process.

4. The control method for an automatic analyzer according to claim 1, wherein the analysis schedule includes: a first scheduling method of determining that an analysis flow passage to be used in the next separation process out of the plural analysis flow passages is configured to be an analysis flow passage determined not to require the solvent substitution process; and
a second scheduling method of determining that an analysis flow passage used in the next separation process out of the plural analysis flow passages is configured to be an analysis flow passage where a separation process is determined to be completed earliest out of a separation process completion timing of an analysis flow passage that is determined not to require the solvent substitution process and the separation process completion timing of an analysis flow passage that is determined to require the solvent substitution process, and
wherein the automatic analyzer includes an input/output device, and the input/output device is configured to select the first scheduling method or the second scheduling method is selected by the input/output device.

5. An automatic analyzer comprising:

a pretreatment unit configured to pretreat a sample;

a separation unit configured to separate the sample using a plurality of solvents and a liquid chromatograph comprising a plurality of analysis flow passages arranged to be parallel to each other, wherein the sample is processed by the pretreatment unit and the plurality of solvents are different from each other;

a detection unit configured to detect the sample separated by the separation unit; and a control unit configured to control the pretreatment unit, the separation unit, and the detection unit, wherein the control unit is further configured to prepare an analysis schedule before execution of an analysis, and wherein the sample is analyzed based on the analysis schedule prepared, and the control unit is configured to determine which one of the plurality of analysis flow passages is to be used in introducing the plurality of separation processes using solvents whose kind is different from each other with a time lag relative to one another, compare a solvent used in a next separation process executed at timing after starting the plural separation processes determined to be introduced with a time lag relative to one another and each of the solvents used in the plurality of separation processes determined to be introduced with a time lag relative to one another, determine whether or not a solvent substitution process is required for the analysis flow passage used in the plurality of separation processes, determine an analysis flow passage used in the next separation process out of the plurality of analysis flow passages according to the determination whether or not the solvent substitution process is required, and prepare the analysis schedule.

6. The automatic analyzer according to claim 5, wherein the control unit is configured to determine that an analysis flow passage used in the next separation process out of the plurality of plural analysis flow passages is an analysis flow passage where the solvent substitution process is determined not to be required.

7. The automatic analyzer according to claim 5, wherein the control unit is configured to determine whether or not a solvent substitution process is required for the analysis flow passage used in the plurality of I separation processes, and, when the solvent substitution process is configured to determine to be required for all of the plurality of analysis flow passages, determines an analysis flow passage where a cycle required for the solvent substitution process is minimum out of the plural analysis flow passages as an analysis flow passage used in the next separation process.

8. The automatic analyzer according to claim 5, wherein the analysis schedule includes: a first scheduling method of determining that an analysis flow passage to be used in the next separation process out of the plural analysis flow passages is configured to be an analysis flow passage determined not to require the solvent substitution process; and a second scheduling method of determining that an analysis flow passage used in the next separation process out of the plural analysis flow passages is configured to be an analysis flow passage where a separation process is determined to be completed earliest out of a separation process completion timing of an analysis flow passage that is determined not to require the solvent substitution process and the separation process completion timing of an analysis flow passage that is determined to require the solvent substitution process, and wherein the automatic analyzer includes an input/output device, and the input/output device is configured to select of the first scheduling method or the second scheduling method is selected by the input/output device.

* * * * *